(12) United States Patent
Chiesa

(10) Patent No.: US 10,689,049 B2
(45) Date of Patent: Jun. 23, 2020

(54) BICYCLE COMPONENT

(71) Applicant: DT SWISS INC., Grand Junction, CO (US)

(72) Inventor: Andrea Chiesa, Comano (CH)

(73) Assignee: DT SWISS INC., Grand Junction, CO (US)

( * ) Notice: Subject to any disclaimer, the term of this patent is extended or adjusted under 35 U.S.C. 154(b) by 0 days.

(21) Appl. No.: 16/100,509

(22) Filed: Aug. 10, 2018

(65) Prior Publication Data
US 2019/0047649 A1    Feb. 14, 2019

(30) Foreign Application Priority Data
Aug. 11, 2017   (DE) .................... 10 2017 118 417

(51) Int. Cl.
*B62J 1/06*   (2006.01)
*B62J 1/08*   (2006.01)
*B62K 19/36*  (2006.01)

(52) U.S. Cl.
CPC . *B62J 1/08* (2013.01); *B62J 1/06* (2013.01); *B62K 19/36* (2013.01); *B62J 2001/085* (2013.01)

(58) Field of Classification Search
CPC ......... B62J 1/00; B62J 1/06; B62J 1/08; B62J 2001/085; F16B 7/10; F16B 7/105; F16B 7/1409; F16B 7/1436; F16B 7/1463
See application file for complete search history.

(56) References Cited

U.S. PATENT DOCUMENTS

| 8,079,772 B1* | 12/2011 | Brennan | B62J 1/08 403/109.1 |
| 8,926,216 B2* | 1/2015 | McAndrews | B62K 19/18 403/109.7 |
| 2006/0202098 A1* | 9/2006 | Hsieh | F16B 7/105 248/410 |

(Continued)

FOREIGN PATENT DOCUMENTS

| DE | 102007063365 A1 | 7/2009 | |
| EP | 3412544 A1 * | 12/2018 | ............... B62J 1/08 |

(Continued)

OTHER PUBLICATIONS

German Search Report from corresponding German Patent Application No. 10 2017 118 417.1, dated Mar. 6, 2018.

(Continued)

*Primary Examiner* — Daniel J Wiley
(74) *Attorney, Agent, or Firm* — Greer, Burns & Crain, Ltd.

(57) ABSTRACT

A bicycle component for an at least partially muscle-powered bicycle. The bicycle component includes a seat post device telescopically adjustable between at least two positions for adjusting the saddle height, and a locking device for locking the seat post device in at least one of the positions. The seat post device has two support members movable relative to one another namely, a first and a second support member, the second support member receiving a saddle. The first support member is disposed at least in sections within the second support member. For telescoping the seat post device, the second support member can at least in sections move over the first support member.

16 Claims, 5 Drawing Sheets

(56) References Cited

U.S. PATENT DOCUMENTS

| | | | |
|---|---|---|---|
| 2014/0061419 A1* | 3/2014 | Wehage | B62J 1/06 |
| | | | 248/404 |
| 2015/0034779 A1 | 2/2015 | McAndrews et al. | |
| 2016/0304146 A1* | 10/2016 | Teixeira | B62J 1/06 |
| 2018/0009494 A1 | 1/2018 | Schlanger | |
| 2018/0134337 A1* | 5/2018 | Holtzman | B62K 19/36 |
| 2018/0273123 A1 | 9/2018 | Eberlberger | |

FOREIGN PATENT DOCUMENTS

| | | | | |
|---|---|---|---|---|
| ES | 1185933 U | 6/2017 | | |
| FR | 2775650 A1 | 9/1999 | | |
| WO | WO-2009083206 A1 * | 7/2009 | | B62J 1/06 |

OTHER PUBLICATIONS

European Search Report from European Patent Application No. 18187248.2, dated Jan. 4, 2019.

* cited by examiner

BICYCLE COMPONENT

BACKGROUND

The present invention relates to a bicycle component for an at least partially muscle-powered bicycle having a telescopically adjustable seat post device adjustable between at least two positions for adapting the saddle height.

An optimal setting of the saddle height is important for the safe control of a bicycle and for an optimal force transmission. This applies both to everyday or city bikes and to sports bicycles. Easily and quickly adapting the saddle height to different riding situations tends to be helpful.

For example, in downhill rides the saddle must be in a low position for the rider to shift his weight behind the saddle so as to shift the center of gravity rearwardly. Riding in the sitting position calls for an ergonomic saddle height setting to allow optimal force application to the drive.

Therefore, bicycles are increasingly equipped with adjustable seat posts also referred to as telescopic seat posts. These telescopic seat posts include two telescoping tubes, the bottom of the larger tube being inserted into the frame with the thinner tube protruding upwardly out of the larger tube. This provides a very large adjusting range, since the inner tube can plunge into the bicycle frame to nearly any depth desired. The rider can as a rule operate the adjustment mechanism of the seat post from the handlebar for adjusting. Thus, the saddle height can be adjusted during riding with the rider remaining mounted.

Hydraulic seat posts allow a great variety of different height position adjustments. Their drawback is, however, that demounting, cleaning and maintenance is difficult. Demounting requires special tools. Moreover, unskilled demounting may cause hydraulic fluid leaks.

Although the known adjustable seat posts function satisfactorily as a rule, they still show improvement potential. The known solutions may in particular be optimized as regards their suitability for application and their weight and also their manufacturing costs and in particular complexity of maintenance.

It is therefore the object of the present invention to provide an improved bicycle component with an adjustable seat post device. In particular, an adjustable seat post is to be provided which functions reliably and uncomplicated and which is economic in manufacture and in particular offers ease of maintenance.

SUMMARY

The bicycle component according to the invention is provided for an at least partially muscle-powered bicycle. The bicycle component comprises a seat post device that is telescopically adjustable between at least two positions for adapting the saddle height. The bicycle component comprises at least one locking device for locking the seat post device in at least one of the positions. The seat post device comprises at least two support members movable relative to one another namely, a first support member and at least one second support member. The first support member may be provided to be fixed to, or else configured at, the frame structure of a bicycle. The second support member serves to receive a saddle. The first support member is disposed at least in sections inside the second support member. For telescoping the seat post device, the second support member can move at least in sections by means of the first support member. This "upside-down" configuration allows a very simple structure.

Particularly preferably, the second support member glides on the first support member and/or is guided by the first support member for height adjustment (of a saddle).

The bicycle component according to the invention offers many advantages. A considerable advantage is the arrangement of the two support members according to the invention. This allows for a configuration of the second or top support member structurally independent of the frame structure and in particular of the seat tube diameter. This allows considerably higher degrees of freedom for the construction and considerably more flexible configuration options to achieve a reliable, cost-reduced seat post device. Moreover, it is a particular advantage that the bicycle component according to the invention can thus particularly well be used with bicycle types other than mountainbikes, e.g. with racing bicycles, cyclo-cross bikes, trekking bikes, and e-bikes.

The invention permits, for example considerably larger diameters for the second or top support member. This also provides for more freedom in selecting the materials for the support members. The bicycle component according to the invention thus also enables an advantageous weight reduction which is a particular advantage in sports bicycles. Another advantage is that higher degrees of freedom ensue for mounting the saddle to the second support member. In the past the top component of telescopic seat posts allowed only a very narrow structural range since its diameter had to be particularly small to fit into the bottom part when retracting the saddle. Also, the bottom part could not just be enlarged because it must in turn fit in the seat tube of the frame.

In all the configurations, it is preferred for the first support member to be of a lightweight material. It is possible for the first and/or the second support member to consist at least partially or else entirely of a fiber-reinforced material such as a carbon material. Particularly preferably the first support member consists at least partially and in particular at least considerably or substantially entirely or entirely of (at least) one fibrous composite material.

More flexible design conditions are also enabled for the first respectively bottom support member. For example, the wall thickness of the first support member may be configured independently of the dimensions of the top support member. Thus, the first or bottom support member may for example be engineered in optimal lightweight design. In the past, the bottom part of telescopic seat posts had to be designed with sufficiently thin walls for the top part to plunge in to enable telescoping. The bottom support member may e.g. be designed in a size to closely fit in the seat tube. This results in an overall considerably more rigid and sturdy while also reduced-weight seat post device.

Another advantage is that the inventive arrangement of the two support members makes the seat post device considerably less prone to dirt and thus offers a particularly reliable function. The movability of the top support member over the bottom support member allows ease of wiping off dirt which simply falls off. In particular, dirt and moisture will not accumulate immediately on top of the joint between the two support members but will be wiped off downwardly.

In the scope of the present invention the term telescoping is in particular understood to mean pushing the support members into one another. For telescoping the seat post device, preferably for lowering the saddle height, the second support member can in particular be at least partially pushed over the first support member. For telescoping the seat post device, preferably for increasing the saddle height, the second support member is in particular at least partially moved upwardly on the first support member. The first support member in particular telescopes into the second support member respectively the second support member moves on the first support member.

In simple configurations, the bicycle component may be configured as a seat post.

Tubular support members are preferably provided. Preferably, the support members are at least partially hollow.

In operational use of the seat post device, the second support member is in particular disposed on top and the first support member, in particular on the bottom. Then, the first support member is in particular received at least in sections in a seat tube of a frame structure of a bicycle. The frame structure may be part of the bicycle component. Also, the bicycle component may comprise, or be configured as, a bicycle.

Preferably, at least one outer contour of the first support member and at least one inner contour of the second support member, i.e. the bushings of the respective support member, are configured to closely fit one another at least in sections, so that the second support member is guided along the first support member. This offers an easily gliding, robust retracting and extending of the seat post device. The outer contour and the inner contour are in particular configured closely fitting where the two support members glide respectively telescope along one another. The first support member is in particular guided inside the second support member respectively the second support member is guided on the outside of the first support member. The first support member may be a fixed component of the bicycle frame structure, or the bicycle frame and it may be fixedly connected or integrally configured therewith.

It is possible to dispose between the two support members at least one anti-twist protection. This prevents the saddle from twisting in operation, and also while the seat post device is lowered or extended. The anti-twist protection is in particular provided by the outer contour of the first support member and the inner contour of the second support member.

The anti-twist protection may also comprise at least one linear guide having at least one guide rail. The guide rail is for example embedded in a recess in the first or second support member. The anti-twist protection may comprise at least one toothing. A different configuration of the anti-twist protection is also conceivable. Particularly preferably, the anti-twist protection enables low-friction adjusting. The anti-twist protection is in particular configured substantially without play or (virtually) without play.

The support members are in particular cylindrical. The external diameter of the first support member is in particular smaller than the internal diameter of the second support member. The support members may be non-round at least in sections.

The locking device is preferably disposed at least partially inside one of the support members and in particular inside the first support member. This provides for a particularly compact seat post device and a low-maintenance accommodation. For example, the first support member is provided with at least one receiving space in which the locking device is at least partially disposed. The locking device is in particular disposed in the first support member to such an extent that only the at least one bolt member is not disposed inside the first support member respectively outside the first support member. The locking device may be disposed at least partially in the second support member.

The locking device preferably comprises at least one bolt member. In the locked state, the bolt member extends in particular through at least one wall of the first support member into the second support member. This offers a structurally uncomplicated while also very reliable locking, enabling a realization without play. In the locked state, the bolt member extends in particular into at least one wall of the second support member. The first support member may comprise at least one through hole for the bolt member to pass through. For example, at least one bore is disposed in the wall. A plurality of bolt members is in particular provided. The locking device is in particular suitable and configured for form-fit blocking of relative movability of the support members relative to one another by means of the bolt member.

In the locked state, the bolt member in particular extends only into part of the wall of the second support member. This shows the advantage of providing a closed outer shell which no dirt can permeate. The second support member in particular comprises at least one recess in the wall in which the bolt member is disposed in the locked state. The recess is for example configured as a depression or a dip. Alternately, it is possible for the bolt member in the locked state to pass through the wall of the second support member.

The locking device is in particular suitable and configured to urge the bolt member by means of at least one piston member at least partially into at least one recess of the second support member. This achieves reliability of positioning the bolt members. A locked position is in particular given if the piston member urges the bolt member into the second support member. The piston member urges the bolt member in particular into the recess of the second support member. The locking device comprises in particular at least one piston member. The recess is in particular disposed in the wall of the second support member.

The piston member can in particular move in the direction of a longitudinal axis of the support members. The piston member presses on the bolt member in particular transverse to the longitudinal axis of the support member. The piston member comprises in particular at least one wedge surface with which to convert a longitudinal movement of the piston member to a transverse movement of the bolt member. The piston member is for example configured as a rod and/or a cylinder. A piston member configuration that is cylindrical at least in sections preferably provides a wedge surface configured on a cone and cone-shaped. Alternately, it is possible for the piston member to be annular in design and/or to be a bushing. The wedge member is in particular matched to the inner diameter and/or the inner contour of the first support member. The piston member is in particular guided in the first support member and preferably guided linearly.

The one or more bolt member/s is/are preferably inserted detachably and in particular not guided.

The piston member is preferably movable in the direction of the longitudinal axis of the first support member in at least one release position. In the release position, the piston member preferably does not urge the bolt member into the second support member. This offers an uncomplicated locking which functions reliably. The piston member in particular comprises at least one recess in which the bolt member can be received in the release position. In the release position, the bolt member is in particular no longer disposed in (the wall of) the second support member.

The bicycle component comprises in particular at least one actuating device for releasing and/or actuating the locking. The actuating device is in particular suitable and configured to move the piston member to the release position and/or the locked position. The actuating device may at least partially or else entirely be provided for manual operation. Alternately, a motor-supported and/or fully automatic operation and/or wireless operation and function is possible. Although a mechanical solution is realized in preferred configurations, the right to realize electrical and/or remotely controlled and/or wireless control options is reserved to the extent as they are technically feasible and legally permitted.

Particularly preferably, the piston member is movable to assume the release position in the direction of the end of the first support member facing away from the second support member or of the end of the first support member that can be accommodated in the frame structure. The piston member is in particular movable by way of pulling and by by at least one cable control to assume the release position in the direction of the end of the first support member facing away from the second support member. This enables a particularly space-saving accommodation of the actuating device. To assume the release position, the wedge member is movable in particular in the direction of that end of the first support member which lies opposite the end of the first support member connected with the second support member. The wedge member can in particular be transferred from the locked position to the release position by way of moving it to the end of the first support member that can be received in the frame structure.

Particularly preferably, the piston member is suitable and configured to be pulled to the release position by means of at least one actuating device. This pulling action can be realized in a particularly uncomplicated and robust way. The piston member with the actuating device is in particular pulled to the end of the first support member that can be received in the frame structure respectively that faces away from the second support member. It is also possible for the piston member to be urged to the release position by means of the actuating device.

In all the configurations, it is preferred for the bicycle component to comprise at least one actuating device for releasing and/or actuating the locking device. The actuating device is in particular the actuating device described above by means of which the piston member is pulled to the release position. Preferably, the actuating device is configured at least partially mechanical. The actuating device may be entirely mechanical.

Preferably, the actuating device comprises at least one cable control with at least one control cable. The actuating device may comprise at least one mechanical operating lever with which to transfer the control cable to at least one position or at least one of the two positions (released/locked). A cable control offers many advantages and it is for example particularly low-maintenance and dependable. The actuating device is in particular suitable and configured to pull the piston member by means of the cable control. The control cable extends in particular inside the first support member. The control cable also extends in particular inside the frame structure and in particular inside the seat tube of the bicycle.

It has been found that in positions where the piston member is not locked the control cable is not precisely positioned or retained in a defined position. Then, the actuating device can be moved without friction in at least one direction without providing the user with a tactile feedback. Then, the user may get the impression that the seat post device is not operating in a defined way and also the user's trust in the reliability may be impaired. To avoid e.g. such an impression, the control cable may be coupled with a cable tensioner to provide the user at all times with a defined, tactile feedback. The cable tensioner prevents play which might otherwise occur.

The control cable is preferably coupled in particular with the piston member by means of at least one cable tensioner. The cable tensioner preferably comprises at least one biasing unit which provides tensioning of the cable. Although the biasing unit may be configured as a mechanical spring it may e.g. also be configured based on magnetics. The biasing unit is preferably disposed on a slider component which retains the end or one of the ends of the control cable. The slider component is urged into a biased state by means of the biasing unit.

The biasing force of the biasing unit is opposite the bias of the biasing device. Preferably, however, the strength of the biasing force of the biasing unit is considerably weaker than the strength of the biasing force of the biasing device so that the biasing device operates at all times with an effective force. The biasing force of the biasing unit is preferably lower than half, in particular lower than one fourth or one eighth of the biasing force of the biasing device.

The biasing unit provides that a force for tensioning the control cable is applied in any state of the actuating device or in any position of the (mechanical) operating lever. The user receives at all times the feedback of a precisely defined function.

It is also possible for the actuating device to be configured at least partially hydraulic.

The actuating device preferably comprises at least one control for pulling or tensioning the control cable. The control can, in particular be mounted to the handlebar device of the bicycle. The control is in particular also configured to actuate and/or tension and/or release the control cable. The control may be suitable and configured to lock the control cable in place, for example in the release position and/or the locked position. The control cable may be biased to one of the two positions e.g. by a spring.

It is particularly preferred for the control cable to emerge from an axial front face of the first support member. This allows for uncomplicated installing of the control cable for example inside the frame structure of the bicycle so as to be well protected. The control cable emerges in particular at the end of the first support member which can be received in the frame structure respectively which faces away from the second support member. The control cable emerges in particular at that end of the first support member which in the operational position faces downwardly or to the ground. The cable control is in particular suitable and configured for the control cable to be installed within the frame structure of a bicycle and in particular at least within the seat tube. It is also possible for the control cable to emerge on the radial side face of the first support member.

The bicycle component comprises in particular at least one preloading device or a biasing device that can be biased to the release position by pulling the piston member. The biasing device is in particular suitable and configured to transfer the piston member from the release position to the locked position when the control cable is released. This offers a cost-effective and dependable resetting of the locking device. This reliably ensures that after adjusting the saddle remains in the desired position.

The biasing device comprises in particular at least one energy storage and for example at least one spring and/or gas spring. The piston member can in particular be moved to the release position against a biasing force of the biasing device.

The actuating device is in particular suitable and configured to transfer the piston member automatically back to the locked position by means of the biasing device when no tensile stress is applied to the piston member respectively when the control cable is no longer pulled. The biasing device is in particular suitable and configured to transfer the piston member from the release position to the locked position when the piston member is no longer actively retained in the release position.

In an advantageous configuration, the bolt member comprises, or is configured as, at least one sphere. This sphere allows a particularly uncomplicated release of the locking without any additional springs or the like when the piston member is pulled to the release position. Particularly preferably a multitude of bolt members and in particular spheres is provided. For example, two or three or four or more bolt members are provided.

The bolt member may comprise at least one pin and/or at least one pawl or the like. Other suitable configurations of the bolt member are also conceivable. It is possible to attribute to the bolt member at least one biasing device which moves the bolt member out of the second support member when the wedge member is in the release position.

Preferably, at least one energy storage device is disposed inside the second support member. The bicycle component comprises in particular at least one energy storage device. The energy storage device is in particular suitable and configured to be at least partially loaded by retracting the first support member into the second support member. The energy storage device is in particular suitable and configured to be at least partially unloaded by extending the first support member out of the second support member so that the seat post device can be extended at least partially automatically.

This energy storage device provides for very comfortably resetting of the seat post device. For example, the rider is only required to lift his weight and operate the control. The energy storage device can in particular be loaded through the rider's weight. The energy storage device is in particular supported on the first and the second support member. The force direction of the energy storage device runs in particular in the direction of the longitudinal axis of the support members. It is possible for the force for moving the saddle by means of the energy storage device to be adjustable. The energy storage device comprises in particular at least one spring and/or at least one gas spring. The energy storage device in particular also resets and/or biases the control cable.

Particularly preferably, the energy storage device is configured such that the extend speed of the seat post device does not exceed a predetermined maximum speed. To this end in particular, at least one spring and/or gas spring having a defined spring force is used. This configuration shows the advantage of reliably preventing a too high speed or even jerky extending of the second support member. This allows omission of e.g. a complicated, weight-increasing damper device. Use of a damper device is possible though. In simple configurations, a friction member may be used for a longer stroke length.

Preferably, at least one friction member is disposed between the two support members. The friction member preferably comprises at least one seal and in particular at least one seal ring and/or at least one O-ring or the like. This friction member shows the advantage that the extend speed of the seat post device can be slowed down. In all the configurations, it is preferred to provide the bicycle component with at least one end damping to accomplish an end damping at least in one end position or preferably in both end positions. This end damping may operate in particular depending on the stroke and act e.g. on the last 10 mm or in particular 5 mm or 2 mm of the stroke.

The first support member preferably comprises at least two tubular support sections which are fixedly connected with one another in a connecting area. This structure of the first support member allows considerable reduction of manufacturing complexity. This allows for example, particular ease of incorporating the locking device and/or the actuating device. The two support sections are preferably glue-bonded with one another. The two support sections may also be press-bonded and/or welded to one another. Other suitable force-fit and/or form-fit and/or adhesive-bonded joints are conceivable. Using lightweight materials such as light metal is preferred. Fiber-reinforced plastics such as carbon materials are particularly preferred.

Preferably, at least one outer contour of the first support member is configured in the connecting area to closely fit at least one inner contour of the second support member. This shows the advantage of achieving a low-friction guide in the connecting area as well. The outer contour and the inner contour are in particular designed such that the second support member is guided on the first support member.

The support sections are preferably disposed overlapping at least in the connecting area. A coaxial arrangement of the two support sections is provided in particular in the connecting area. Alternately, an abutting arrangement of the support sections is provided.

Preferably, one of the support sections shows at least in sections a greater wall thickness than does the other of the support sections. One of the support sections in particular shows at least one through hole for the bolt member. The other of the support sections in particular shows no through hole for the bolt member. The two support sections offer an uncomplicated option to realize different wall thicknesses. The configuration achieved is thus very stable while also being particularly lightweight.

In an advantageous configuration, one of the support sections consists at least considerably of a fibrous composite material. Preferably, the other of the support sections consists at least considerably of a lightweight metal material. The lightweight material is in particular an aluminum material, for example an aluminum alloy. This mixture of materials achieves an optimal weight combined with particularly high stability for each of the support sections and pertaining function. Alternately, lightweight materials containing magnesium or other metallic lightweight materials are conceivable.

It is also possible and preferred for both of the support sections to be manufactured at least considerably of a metallic lightweight material. This provides a particularly cost-reduced while also reliable seat post. It is also possible for both of the support sections to be manufactured at least considerably of a fibrous composite material.

The first support member may also be provided by one single or continuous tubular component. This configuration offers the advantages of the bicycle component according to the invention combined with particular cost optimization. The component is in particular manufactured from a fibrous composite material or a metallic lightweight material.

Selecting suitable lightweight materials for the first support member (light metal, fibrous composite material, carbon) and the second support member allows to achieve a low total weight combined with high stability. As the bolt members and each of the components wear down they readily permit exchanging.

In all the configurations, exchanging individual components is readily feasible without tools. This allows maintenance of the bicycle component as required or on a regular basis. Particularly preferably no tools and in particular no special tools are required. The bolt members preferably consist of a sturdy material and in particular of a material that is sturdy and more wear-resistant compared to the first and/or second support members. This reduces maintenance work. The bolt members may be hardened and/or coated with at least one layer to provide e.g. a hard surface.

At least one support section, preferably that support section showing the greater wall thickness, receives and guides the piston member therein. The support section having the greater wall thickness preferably accommodates the biasing device. One of the support sections in particular provides a linear guide for the piston member. It is also preferred for the energy storage device to be directly or indirectly supported on one of the support sections.

In all the configurations, it is preferred for the stroke length of the seat post device to lie between 15 mm and 60 mm, and in particular between 20 mm and 50 mm. The maximum stroke length may also be 40 mm or 30 mm. A stroke length between 30 mm and 50 mm is particularly preferably provided. Alternately, a shorter or longer maximum stroke length is conceivable. A stroke length of up to 80 mm or up to 100 mm is also conceivable and preferred. The stroke length relates in particular to a movement of the second support member relative to the first support member.

This configuration has been found to be particularly advantageous for adapting the sitting position for good aerodynamic properties of a bicycle including the rider sitting thereon. Thus, for example lowering the sitting height by one millimeter can reduce the power required for riding by up to 1 W or still more for high traveling speeds due to the reduced aerodynamic drag. Lowering the saddle height is thus highly advantageous in many riding situations, and in particular in competitions or in e-bikes to improve the operational range. The lowering should be minimal though to retain the most favorable seating position in terms of ergonomics. The bicycle component according to the invention is particularly suitable therefor. The maximum stroke length described above therefore allows considerable improvement of the aerodynamic properties and thus of the riding performance of the rider or the e-bike drive.

Safety is enhanced. The user of an e-bike may for example lower the seat post device when stopping at a traffic light or otherwise to better and more securely place his foot on the ground.

The seat post device is in particular adjustable between two positions only. The positions are in particular end positions. In particular, no intermediate positions are provided. This offers quick and comfortable adjustment of the sitting position for reduced aerodynamic drag.

The invention provides a very simple and reliable option of height adjustment.

At least one through opening is in particular provided in the first support member for each position and at least one recess each in the second support member. Both positions can in particular be locked.

Alternately, at least one intermediate position may be adjustable between the two positions. The locking device is in particular suitable and configured to automatically return to a locked position and to keep the position locked as any of the two positions and/or an intermediate position is reached. This may require actuating and/or releasing the actuating device.

In one configuration, the bicycle component comprises at least one hydraulic damper device for damping the telescopic movement. In particular, extending the seat post device can be damped. Damping may be provided for retracting as well. This provides particularly comfortable adjusting of the seat post device, since jerky extension movement when releasing the lock is avoided.

The damper device preferably comprises at least two damper chambers between which a damping fluid can flow through at least one valve device. The valve device is in particular provided for controlled influencing of the flow of the damping fluid between the damper chambers. Damping may be fixed or adjustable.

The piston member preferably provides at least part of the valve device of the damper device. The piston member is in particular configured as a valve piston of the valve device. The piston member is in particular suitable and configured for controlled influencing of the flow of the damping fluid between the damper chambers.

It is possible for the damper device and the energy storage device to be combined with one another. The damper device may for example be combined with at least one spring. The energy storage device and the damper device are preferably configured as a gas shock absorber.

The bicycle according to the invention is at least partially muscle-powered and comprises at least one bicycle component as it has been described above.

The bicycle according to the invention also offers many advantages. One advantage is that the bicycle always provides an optimal sitting position in any riding situation.

The control cable in particular extends at least in sections inside a seat tube and/or another bicycle frame structure.

BRIEF DESCRIPTION OF THE DRAWINGS

Further advantages and features of the present invention can be taken from the description of the exemplary embodiments which will be discussed below with reference to the enclosed figures.

The figures show in.

DETAILED DESCRIPTION

Figure 1:
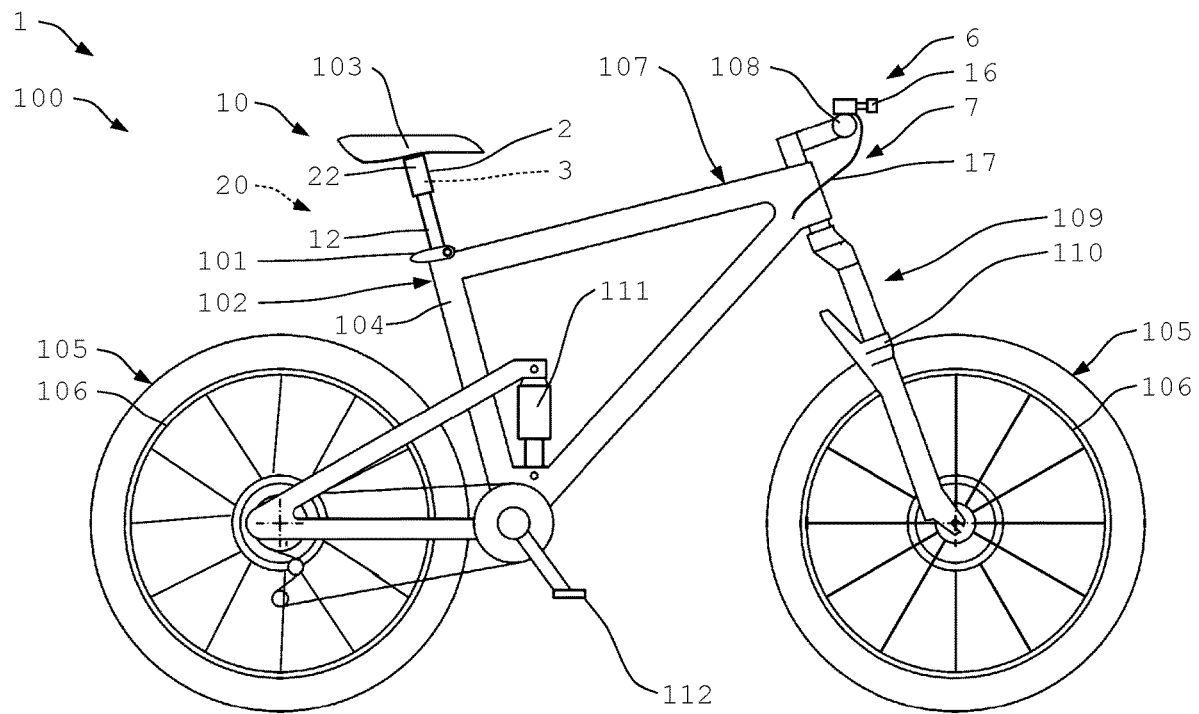
FIG. 1 a simplistic illustration of a bicycle with an inventive bicycle component.
Figure 2:
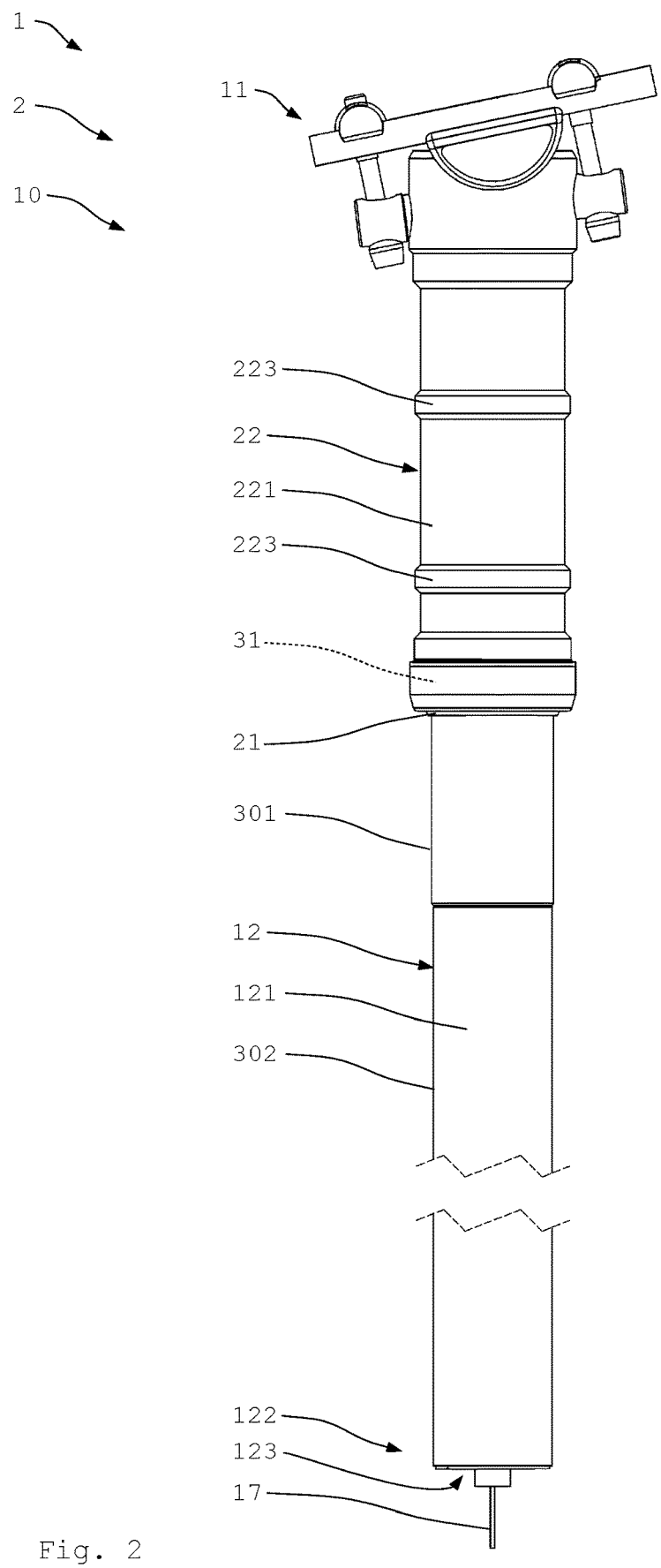
FIG. 2 a schematic illustration of an inventive bicycle component in a side view.

FIG. 1 shows a bicycle 100 configured as a mountainbike with an inventive bicycle component 1. The bicycle 100 may also be configured as a partially muscle-powered two-wheeled vehicle and for example an E-bike.

The bicycle 100 comprises two wheels 105 each equipped with a hub and a rim 106. The bicycle 100 is a full suspension bicycle. The fork 109 is configured as a suspension fork 110 and the frame 107 comprises a rear wheel damper 111.

Furthermore, the bicycle 100 comprises a saddle 103, a frame 107, a handlebar 108 and other bicycle components. This bicycle 100 comprises a derailleur 113 forming part of a pedal drive 112. Moreover, the bicycle 100 includes a brake device not shown in detail.

The bicycle component 1 comprises an adjustable seat post device 2 which is accommodated in a frame structure 102 configured as a seat tube 104. The seat post device 2 is fastened in the seat tube 104 by means of a seat tube clamp 101.

The seat post device 2 is configured adjustable so that the saddle 103 can be fixed in various positions or saddle heights respectively. To this end, the seat post device 2 comprises two support members 12, 22 provided for telescopic extending and pushing into one another.

The illustration shows the seat post device 2 in a first position 10 extended to the maximum. A lower saddle height may also be set. Then, the seat post device 2 is pushed together and put in a position 20 retracted to the maximum, not shown in detail. One configuration provides for the seat post device to be adjusted to one or more intermediate positions.

For locking a set saddle position, the bicycle component 1 comprises a locking device 3 disposed in the interior of the seat post device 2, not visible here. F or releasing or actuating the locking, an actuating device 6 is provided with a control 16 attached to the handlebar 108.

The actuating device 6 comprises a cable control 7 with a control cable 17. The cable control 7 may comprise various components for guiding the control cable 17, for example pulleys or the like. This control cable 17 extends from the control 16 into the frame 107 and through the seat tube 104 into the seat post device 2 to the locking device 3.

The control cable 17 is for example tensioned by way of the control 16 to release the locking device 3. Then the rider can either urge the saddle downwardly or upwardly when sitting down or lifting his weight, supported by an energy storage device 9, not shown. Then the seat post device 2 locks in the current position 10, 20. It is also possible to provide continuous adjustment, so that e.g. the saddle 103 remains in position as the control 16 is released.

The FIGS. 2 to 5 show various illustrations of a bicycle component 1 according to the invention. The bicycle component 1 will now be described in detail with reference to the FIGS. 2 to 5.

The bicycle component 1 comprises a seat post device 2 having a first or bottom support member 12 and a second or top support member 22. The two support members 12, 22 are telescopic.

The top support member 22 is equipped with a saddle accommodation 11 for mounting a saddle to the seat post device 2.

The second support member 22 may be a separate part or alternately may be configured integrally with the frame structure of the bicycle or may be fixed or provided to be fixed thereto.

A seal 31 or O-ring is disposed at the end of the top support member 22 opposite the saddle accommodation 11. The top support member 22 shows a collar to receive the seal 31.

A mud guard 21 is disposed at the end of the support member 22 opposite the saddle accommodation 11. This serves to wipe off dirt in retracting.

Figure 3:
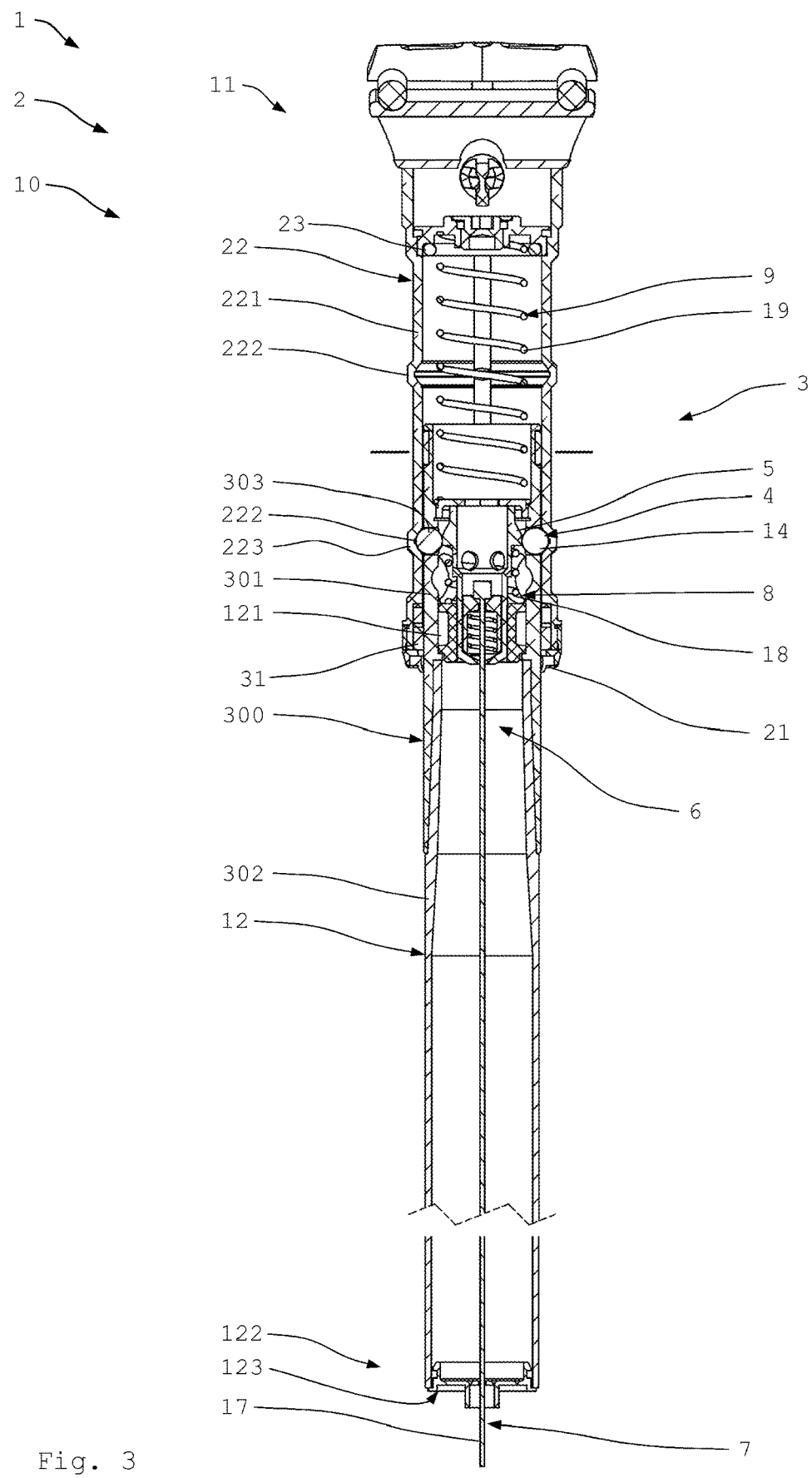
FIG. 3 a sectional side view of the bicycle component.
Figure 4:
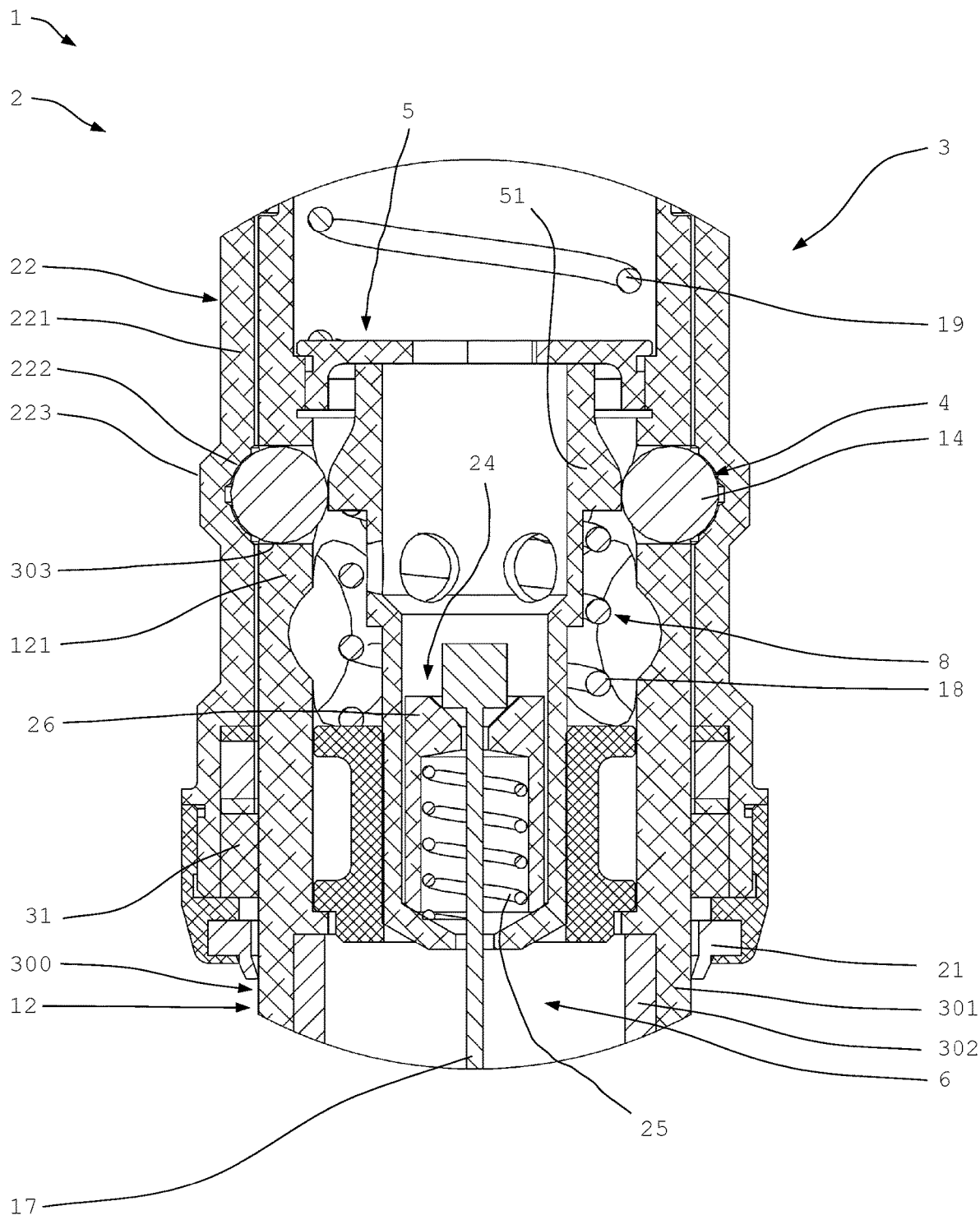
FIG. 4 a detail illustration of the bicycle component according to FIG. 3.

The FIGS. 3 and 4 clearly show the interior components of the seat post device 2. The locking device 3 is disposed substantially inside the first support member 12. The locking device 3 comprises a plurality of bolt members 4, two of which are shown. The bolt members 4 are configured as spheres 14.

The bolt members 4 extend through a wall 121 of the first support member 12. The wall 121 shows a through hole 303 therefor. The bolt member 4 extends further into a part of a wall 221 of the second support member 22. A recess 222 is configured for the bolt member 4. In the region of the recess 222 the wall 221 is provided with a projection 223 facing outwardly. The recess 122 is circumferential respectively circular. Alternately, a configuration is conceivable where a recess 222 is provided for each of the bolt members 4.

The bolt members 4 are urged into the recess 222 by way of a piston member 5 or a cone 51 of the piston member 5 respectively. In this position, the bolt members 4 prevent the second or top support member 22 from lowering further. The saddle height, respectively the positions of the two support members 12, 22 to one another is/are thus locked. The piston member 5 and the bolt members 4 are in a locked or blocked position. The top position 10 of the bicycle component 1 or of the seat post or seat post device 2 is illustrated. The bolt members 4 are locked in the bottom recesses 222 of the second support member 22.

The piston member 5 is pulled downwardly in the direction of the longitudinal axis of the support members 12, 22 to release the locking device 3 and retract the seat post device 2. Then, the piston member 5 is transferred to a release position. In the release position, pressure on the saddle, for example by the rider's weight, allows lowering of the saddle height.

This piston member 5 is conical, tapering toward the top end. When the piston member 5 is pressed downwardly the bolt members 4 cease to be urged into the recess 222 (via the cone 51). Thus, the top support member 22 can be pushed over the bottom support member 12.

For locking the saddle height in the retracted, lower position 20 the locking device 3 comprises an additional recess 222 further upwardly. The piston member 5 can force the bolt members 4 in so as to lock the seat post device 2 in this position.

The bicycle component 1 comprises an energy storage device 9 configured as a spring 19 which is biased as the seat post device 2 is retracted. To this end, the spring 19 is configured as a compression spring. While the seat post device 2 is locked in the bottom position 20 and the piston member 5 is transferred to the release position, the top support member 22 is automatically moving upwardly together with the saddle due to the force of the biased spring 19.

To reliably retain the piston member 5 in the locked position, the locking device 3 is provided with a biasing device 8. The biasing device 8 comprises a spring 18 which automatically urges the piston member 5 to the locked position.

The piston member 5 is moved between the release position and the locked position by means of an actuating device 6 having a cable control 7. To release the lock, the piston member 5 is pulled downwardly by means of a control cable 17 of the cable control 7. While the control cable 17 is tensioned, the piston member 5 remains in the release position and the bolt members 4 are not urged into the recess 222. As the control cable 17 is released, the biasing device 8 urges the piston unit 5 back into the locked position.

Actuating the cable control 7 is provided for example by means of a control 16 as it was described with reference to FIG. 1.

The control cable 17 extends through the bottom support member 12 which it exits at an end 122 that can be received in the seat tube 104 of the bicycle 100. The control cable 17 exits from the support member on an axial front face 123.

The first support member 12 is built of two tubular support sections 301, 302 joined together in a connecting area 300. The support sections 301, 302 are disposed to overlap in the connecting area 300. The support section 301 which in the operational state is on top shows a wall thickness greater than that of the bottom support section 302. The top support section 301 comprises the through hole 303 for the bolt members 4. Moreover, the piston member 5 is guided in the top support section 301.

The first support member 12 comprises an outer contour 120 matched to the inner contour 220 of the second support member. The outer contour 120 of the first support member 12 is provided by the two support sections 301 and 302. Thus, the top support member 22 can be readily pushed over the connecting area 300 without jamming.

An end position damping 23 is provided in the region of the top end of the second support member 22. An end position damping may also be provided at the bottom end.

The control cable 17 is coupled with a cable tensioner 24 to convey to the user a defined functioning feel in any position of the actuating device. This will provide the user with a defined, tactile feedback at any time when touching or moving the actuating device.

The cable tensioner 24 comprises a biasing unit 25 and a slider component 26 that is axially guided inside the piston member. The slider component is urged to a biased state by means of the biasing unit, retaining the cable tensioned at all times.

Figure 5:
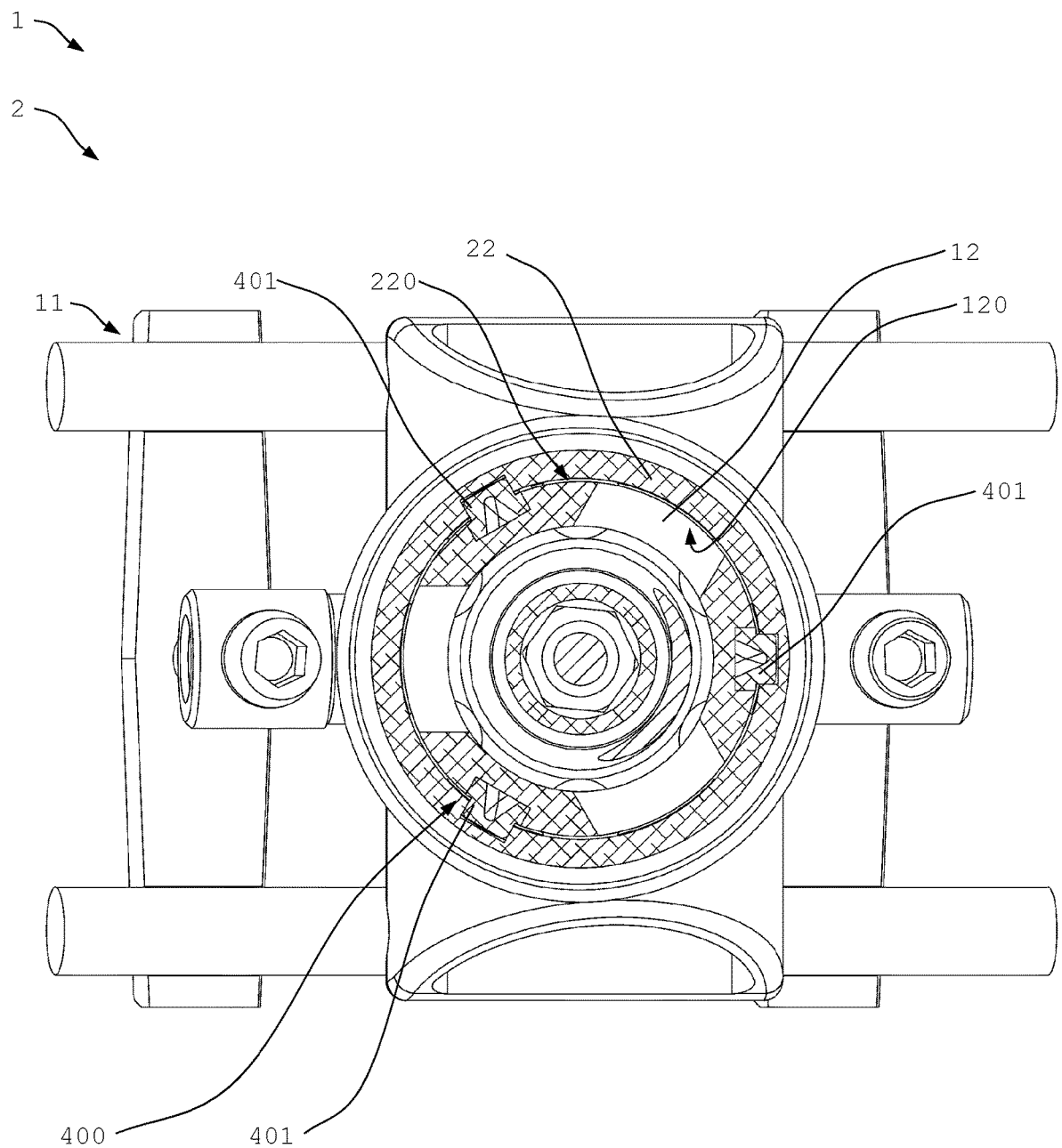
FIG. 5 the bicycle component in a sectional bottom view.

FIG. 5 shows particularly clearly that the two support members 12, 22 comprise a substantially round outer contour 120 and inner contour 220. An anti-twist protection 400 having three guide members 401 is provided to prevent undesired rotation of the saddle. The guide members 401 are disposed between the two support members 12, 22. Thus, the two support members 12, 22 are non-rotatably connected with one another.

The seat post device 2 shown may comprise a damper device for damping the telescopic movement. Then, the piston member 5 is configured for example as a valve piston which influences the flow of a damping fluid.

While a particular embodiment of the present bicycle component has been described herein, it will be appreciated by those skilled in the art that changes and modifications may be made thereto without departing from the invention in its broader aspects and as set forth in the following claims.

LIST OF REFERENCE NUMERALS

| | |
|---|---|
| 1 | bicycle component |
| 2 | seat post device |
| 3 | locking device |
| 4 | bolt member |
| 5 | piston member |
| 6 | actuating device |
| 7 | cable control |
| 8 | biasing device |
| 9 | energy storage device |
| 10 | position |
| 11 | saddle accommodation |
| 12 | first support member |
| 14 | sphere |
| 16 | control |
| 17 | control cable |
| 18 | spring |
| 19 | spring |
| 20 | position |
| 21 | mud guard |
| 22 | second support member |
| 23 | end position damper |
| 24 | cable tensioner |
| 25 | biasing unit |
| 26 | slider component |
| 31 | seal |
| 100 | bicycle |
| 101 | seat tube clamp |
| 102 | frame structure |
| 103 | saddle |
| 104 | seat tube |
| 105 | wheel |
| 106 | rim |
| 107 | frame |
| 108 | handlebar |
| 109 | fork |
| 110 | suspension fork |
| 111 | damper |
| 112 | pedal drive |
| 113 | derailleur |
| 120 | outer contour |
| 121 | wall |
| 122 | end |
| 123 | front face |
| 220 | inner contour |
| 221 | wall |
| 222 | recess |
| 223 | projection |
| 300 | connecting area |
| 301 | support section |
| 302 | support section |
| 303 | through hole |
| 400 | anti-twist protection |
| 401 | guide member |

The invention claimed is:

1. A bicycle component for an at least partially muscle-powered bicycle, comprising: a seat post device telescopically adjustable between at least two positions for adjusting a saddle height; at least one locking device for locking the seat post device in at least one of the positions; the seat post device having at least two support members movable relative to one another namely, a first support member and a second support member, wherein a saddle is mounted to the second support member; the first support member is disposed inside the second support member at least in sections; and for telescoping the seat post device, the second support member is movable at least in sections over the first support member; wherein the locking device is at least partially disposed inside the first support member; wherein the locking device comprises at least one bolt member, which in a locked state extends through at least one wall of the first support member into the second support member; and wherein the bolt member comprises, or is configured as, at least one sphere.

2. The bicycle component according to claim 1, wherein in the locked state the bolt member extends only into part of a wall of the second support member.

3. The bicycle component according to claim 1, wherein the locking device is configured for urging the bolt member at least partially into at least one recess of the second support member by means of at least one piston member, and wherein the piston member is movable in the direction of a longitudinal axis of the first support member to at least one release position, and wherein in the release position the piston member does not urge the bolt member into the second support member.

4. The bicycle component according to claim 3, wherein the piston member is movable in particular by pulling to assume the release position in the direction of a lower end of the first support member facing away from the second support member.

5. The bicycle component according to claim 1, comprising at least one actuating device for releasing and/or actuating the locking device, and wherein the actuating device is at least partially mechanical and comprises at least one cable control having at least one control cable.

6. The bicycle component according to claim 5, wherein the control cable exits from an axial front face of the first support member.

7. The bicycle component according to claim 5, wherein the control cable is coupled with a cable tensioner.

8. The bicycle component according to claim 1, wherein at least one energy storage device is disposed inside the second support member, and wherein the energy storage device is suitable and configured to be at least partially loaded by retracting the first support member into the second support member, and to be at least partially unloaded by extending the first support member out of the second support member so that the seat post device can be extended at least partially automatically.

9. The bicycle component according to claim 1, wherein the first support member and/or the second support member includes a fibrous composite material.

10. The bicycle component according to claim 1, wherein the first support member comprises at least two tubular support sections fixedly joined to one another in a connecting area.

11. The bicycle component according to claim 10, wherein one support section has at least in sections a greater wall thickness than does the other support section and comprises at least one through hole for the bolt member.

12. The bicycle component according to claim 10, wherein one support section includes a fibrous composite material and/or wherein the other support section includes a metallic lightweight material and in particular an aluminum material.

13. The bicycle component according to claim 1, wherein the seat post device has a maximum stroke length of 100 mm.

14. A bicycle that is at least partially muscle-powered, comprising at least one bicycle component according to claim 1.

15. A bicycle component for an at least partially muscle-powered bicycle, comprising: a seat post device telescopically adjustable between at least two positions for adjusting a saddle height; at least one locking device for locking the seat post device in at least one of the positions; the seat post device having at least two support members movable relative to one another namely, a first support member and a second support member, wherein a saddle is mounted to the second support member; the first support member is disposed inside the second support member at least in sections; for telescoping the seat post device, the second support member is movable at least in sections over the first support member; and wherein at least one energy storage device is disposed inside the second support member, and wherein the energy storage device is suitable and configured to be at least partially loaded by retracting the first support member into the second support member, and to be at least partially unloaded by extending the first support member out of the second support member so that the seat post device can be extended at least partially automatically.

16. A bicycle component for an at least partially muscle-powered bicycle, comprising: a seat post device telescopically adjustable between at least two positions for adjusting a saddle height; at least one locking device for locking the seat post device in at least one of the positions; the seat post device having at least two support members movable relative to one another namely, a first support member and a second support member, wherein a saddle is mounted to the second support member; the first support member is disposed inside the second support member at least in sections; for telescoping the seat post device, the second support member is movable at least in sections over the first support member; and wherein one support section has at least in sections a greater wall thickness than does the other support section and comprises at least one through hole for the bolt member.

* * * * *